United States Patent [19]

Andersson

[11] Patent Number: 4,531,687
[45] Date of Patent: Jul. 30, 1985

[54] RETRACTOR REEL FOR A VEHICLE SAFETY BELT

[75] Inventor: Tommy Andersson, Alingsas, Sweden
[73] Assignee: Autoliv Aktiebolag, Vargarda, Sweden
[21] Appl. No.: 549,556
[22] Filed: Nov. 7, 1983
[51] Int. Cl.³ .................... A62B 35/02; B65H 75/48
[52] U.S. Cl. .................... 242/107.4 A; 242/107.4 B
[58] Field of Search ............. 242/107.4 B, 107.4 A; 280/806; 297/478, 480

[56] References Cited

U.S. PATENT DOCUMENTS

| | | | |
|---|---|---|---|
| 2,953,315 | 9/1960 | Lautier et al. | 242/107.4 B |
| 3,430,885 | 3/1969 | Holmberg | 242/107.4 B |
| 4,101,092 | 7/1978 | Schmelow | 242/107.4 B |
| 4,135,682 | 1/1979 | Mizuno | 242/107.4 B |
| 4,432,507 | 2/1984 | Rietsch et al. | 242/107.4 B |
| 4,463,917 | 8/1984 | Mori et al. | 242/107.4 B |

FOREIGN PATENT DOCUMENTS 1351642 5/1974 United Kingdom .

*Primary Examiner*—John M. Jillions
*Attorney, Agent, or Firm*—Spencer & Frank

[57] ABSTRACT

A retractor reel for a vehicle safety belt comprising a shaft rotatably mounted on a support adapted automatically to wind a safety belt when the belt is not in use and incorporating means for locking the shaft to prevent the belt being withdrawn from the retractor reel under certain conditions, said locking means comprising stop abutment means on said support and at least one locking pin which extends through an aperture in the shaft, substantially diametrically across the shaft, substantially perpendicularly to the longitudinal axis of the shaft, the locking pin being axially movable between a retracted position and an extended locking position, the locking pin, when in the locking position, having an engagement end extending out of the shaft on one side thereof to cooperate with a stop abutment means provided on the support to prevent rotation of the shaft, the opposite end of the locking pin engaging the shaft on the other side of the axis of the shaft that is remote from the engagement end of the locking pin, there being a control disk rotatably mounted on the shaft for controlling movement of the locking pin.

8 Claims, 3 Drawing Figures

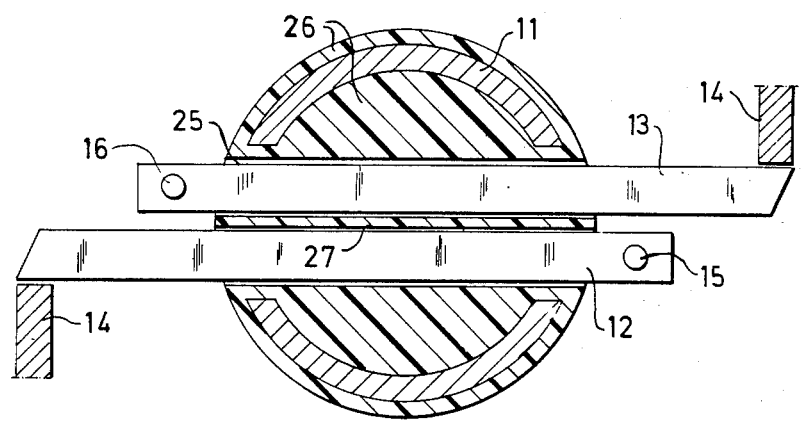

RETRACTOR REEL FOR A VEHICLE SAFETY BELT

BACKGROUND OF THE INVENTION

The present invention relates to a retractor reel for a vehicle safety belt, and more particularly to a retractor reel for a vehicle safety belt adapted to be used in a motor car.

Many different retractor reels have been proposed previously for use with vehicle safety belts mounted in motor cars. In a typical prior proposed device the safety belt is automatically wound onto a shaft when the belt is not in use. The shaft is rotatably supported by appropriate bearings. Usually such a device incorporates a locking arrangement which prevents the belt withdrawn from the reel under certain circumstances, for example when the vehicle is subjected to a sudden deceleration, and/or when the belt is subjected to a force tending to withdraw the belt rapidly from the reel.

It has been proposed previously to utilize locking pins to effect the appropriate locking of the rotatable shaft in such a retractor reel. For example, U.S. Pat. No. 3,430,885 discloses an arrangement in which a plurality of locking pins are provided, which are arranged to extend radially of the rotatable shaft. The pins are kept in a retracted non-locking position by means of a permanent magnet located in the centre of the shaft. The locking pins are movable in a radial direction, and are thus adapted to be moved to an extended or locking position by the centrifugal force experienced by the pins when the belt is rapidly withdrawn from the reel. It will be appreciated that this locking mechanism is only actuated when the belt is rapidly withdrawn, and is, thus, only "belt sensitive". The mechanism is not "vehicle sensitive" in that locking is not effected as a direct consequence of the vehicle being subjected to rapid deceleration. This is clearly a disadvantage. Also, in the embodiment described in U.S. Pat. No. 3,430,885, the described shaft is difficult to manufacture.

U.S. Pat. No. 2,953,315 describes a retractor reel having two pins which are located in alignment, one on each side of the axis of a shaft, and which can move radially relative to the shaft. The pins are adapted to be moved as a consequence of relative movement between the rotatable shaft and an inertia body which is rotatably mounted on the shaft. This mechanism is only "belt sensitive" but can be adapted so as to provide a locking effect in response to deceleration of a vehicle, i.e. so that the locking mechanism is "vehicle sensitive" as well as "belt sensitive". However, this mechanism is very complicated to manufacture.

The locking mechanisms described in the above mentioned Patent Specifications all have a complicated shaft design because the force that may be exerted on a vehicle safety belt when the reel is locked under emergency conditions may be very high, and this force has to be transferred from the belt of the safety belt to the locking means through the shaft. Thus the shaft must be able to withstand the appropriate force without failing.

The problem of transferring the force from the belt to the locking means can be solved in a relatively easy way by providing a separate locking means capable of engaging one or two notched wheels attached to one or both ends of the shaft. However, if this solution is adopted other problems arise, for example the problem of providing a reliable control of separate locking means which engage two notched wheels.

BRIEF SUMMARY OF THE INVENTION

According to one aspect of this invention there is provided a retractor reel for a vehicle safety belt comprising a shaft rotatably mounted on a support adapted automatically to wind in a safety belt when the belt is not in use and incorporating means for locking the shaft to prevent the belt being withdrawn from the retractor reel under certain conditions, said locking means comprising stop abutment means on said support and at least one locking pin which extends through an aperture in the shaft, substantially diametrically across the shaft, substantially perpendicularly to the longitudinal axis of the shaft, the locking pin being axial movable between a retracted position and an extended locking position, the locking pin, when in the locking position, having an engagement end extending out of the shaft on one side thereof to cooperate with a stop abutment means provided on the support to prevent rotation of the shaft, the opposite end of the locking pin engaging the shaft on the other side of the axis of the shaft that is remote from the engagement end of the locking pin, there being a control disk rotatably mounted on the shaft for controlling movement of the locking pin.

Preferably two substantially parallel locking pins are provided, both displaceably mounted in the shaft extending perpendicularly to the axis of the shaft, the pins being displaceable in opposite directions.

Conveniently the two locking pins are located in a common plane that is perpendicular to the axis of the shaft.

Advantageously the locking pins are arranged such that the locking pins substantially abut each other when in their locking positions.

Preferably said stop abutment means consists of a ring of protruding stop elements, concentric with the shaft, the arrangement being such that when the or each locking pin is in the locking position, the end of the locking pin remote from the engagement end is substantially midway between the surface of the shaft and the said ring of stop elements.

Conveniently the shaft is tubular and is moulded into a covering of appropriate material, the or each locking pin passing through an aperture formed in the tube, there being covering material between the or each locking pin and the tube.

Preferably the said covering is formed of a plastics material, and surrounds the tube and completely fills the tube.

Advantageously there are two locking pins with an intermediate layer of plastics material located between them.

Conveniently the or each locking pin is provided with means arranged to cooperate with guide means or a guide surface on the control disk to effect movement of the pins on the occurrence of relative movement between the control disk and the shaft.

Preferably the control disk is or is associated with an inertia member so that, on rapid withdrawal of the belt, there is a relative movement between the control disk and the shaft.

Advantageously deceleration sensitive means are provided to prevent rotation of the control disk when a deceleration above a predetermined deceleration is exerted on the retractor reel.

INTRODUCTION TO THE DRAWINGS

In order that the invention may be more readily understood, and so that further features thereof may be appreciated, the invention will now be described by way of example with reference to the accompanying drawings in which:

FIG. 3 is a cross-sectional view through the shaft of the retractor reel of FIGS. 1 and 2 showing the locking pins.

DESCRIPTION OF PREFERRED EMBODIMENT

Figure 1:
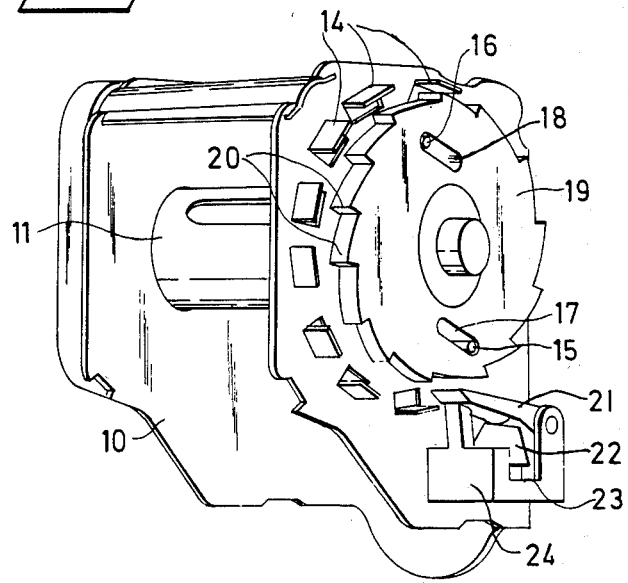
FIG. 1 is a perspective view of a safety belt retractor reel in accordance with the invention, with the cover removed to illustrate the working parts of the reel.
Figure 2:
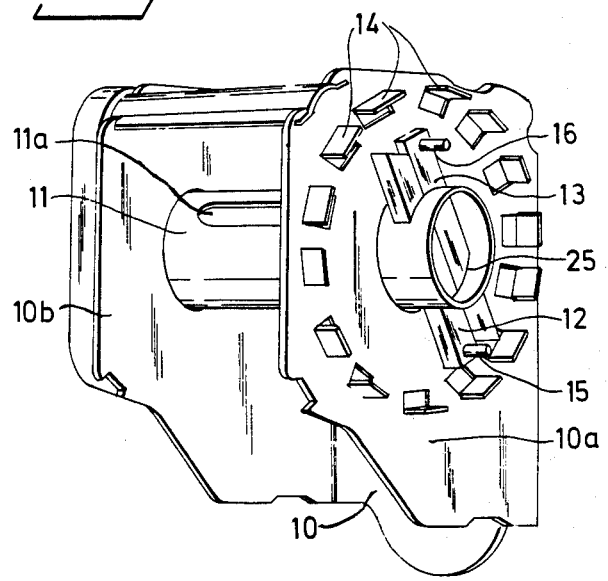
FIG. 2 is a view corresponding to FIG. 1 with various components removed to illustrate more clearly the locking pins.

FIGS. 1 and 2 are corresponding perspective views of a retractor reel in accordance with the invention. It is to be understood that such a retractor reel would normally be provided with a cover to prevent external objects contacting the moving parts of the reel, so that free operation of the movable parts of the reel is not prevented or hindered in any way.

The reel assembly comprises a support 10 which is adapted to be mounted on a car body. The support 10 includes substantially planar plate having two forwardly extending parallel flanges 10a, 10b (FIG. 2). The flanges are parallel and are of substantially the same shape. A rotatable shaft 11 extends between the flanges and is rotatably supported on the flanges. An aperture 11a is provided extending through the shaft 11 to facilitate the attachment of one end of the safety belt to the shaft. The safety belt may be wound onto the shaft.

One end of the shaft extends beyond the flange 10a and is provided with a device for locking the shaft to prevent rotation of the shaft relative to the support 10, thus preventing extraction of the safety belt from the reel.

The shaft is provided with a helical spring (not shown) for automatic retraction and coiling of the belt when the safety belt is not in use. The helical spring is provided at the end of the shaft opposite to the locking device.

The locking device comprises various components including two locking pins 12, 13. The locking pins extend, parallel with each other, substantially diametrically through the shaft 11. The structure of the shaft and the way in which the pins are located in the shaft will be described hereinafter in greater detail. The pins are adapted to move in opposite directions to a protruding position in which they can engage with fixed stop abutment means 14 constituted by a circular array of detents securely mounted on the flanges 10a of the support 10. The array of detent 14 is coaxial with the axis of the shaft 11. When the locking pins 12, 13 engage the detents 14 the shaft 11 is prevented from further rotation.

Each locking pin 12, 13 is provided with a respective guide pin 15, 16, constituted by a pin extending from one end of the locking pin in a direction parallel to the axis of the shaft 11. A control disc 19 is provided which is rotatably mounted on the shaft 11 adjacent the locking pins 12, 13. Guide grooves 17, 18, the sidewalls of which form guide surfaces to engage the guide pins, are provided in the control disk and the arrangement is such that each of the guide pins 15, 16 is accommodated within a respective guide groove 17, 18. The guide grooves are of arcuate form, the inner end of each guide groove being closer to the axis of the shaft 11 than is the outer end of each guide groove.

The control disk 19 is connected to the shaft 11 by means of a helical spring (not shown) so that, under normal circumstances when the shaft is only rotated slowly, the control disk 19 can move substantially in synchronism with the shaft.

It is to be understood that the guide grooves 17, 18 of the control disk 19 are so positioned and have such a length and shape that when the control disk is turned relative to the shaft a force is applied to the guide pins 15, 16 and the locking pins 12, 13 can thus be moved from a retracted position in which the locking pins do not engage with the stop means 14, to a protruding locking position in which one end of each of the locking pins is in engagement with a corresponding stop means 14.

The locking pins 12, 13 are illustrated in the retracted or non-locking position in FIG. 2. In this position the centers of gravity of the locking pins are close to the center of the shaft, so that the pins are, at the worst, only slightly influenced by centrifugal force during rotation of the shaft.

The control disk 19 is provided with a plurality of teeth 20 spaced around the circumference of the disk. A tiltable lever 21 is provided located adjacent the periphery of the control disk 19. The lever 21 can move from a position in which it does not engage the teeth of the locking disk 19, to a position in which there is engagement.

The lever 21 is mounted on a shaft which is attached to a support just outside the circumference of the control disk. A tiltable inertia member 22 is provided which stands on a base plate 23 which forms part of a housing 24. A protrusion provided on the undersurface of the lever 21, substantially at the mid-point thereof, engages on top of the tiltable inertia member 22. The inertia member 22 is arranged to topple when the vehicle is subjected to rapid acceleration or deceleration. The consequence of this toppling of the inertia member 22 is that the lever 21 is tilted upwardly and one end of the lever is brought into engagement with the teeth 20 provided at the periphery of the control disk 19. Further rotation of the control disk 19 is then prevented which will, as is explained hereinafter, prevent the further extraction of the safety belt from the retractor reel. A tiltable member of this general type is described in British Patent Specification No. 1,351,642.

Referring now to FIGS. 2 and 3 it will be appreciated that in the illustrated embodiment the shaft 11 is shown as being a tube and the locking pins are mounted in a through bore 25 which extends diametrically through the shaft perpendicular to the axis of the shaft. The pins are positioned adjacent to each other in a plane that is perpendicular to the axis of the shaft and both pins have such a length that their ends extend beyond the periphery of the shaft on either side of the shaft. The length of the locking pins is such that when the locking pins are in the retracted position illustrated in FIG. 2 the locking pins do not engage the stop means 14 and thus do not prevent rotation of the shaft. However, when the locking pins are moved from the retracted or non-locking position one end of each of the locking pins will engage a stop means 14 thus preventing further rotation of the shaft as shown in FIG. 3. It is to be noted that when the pins are in the locking position the ends of the locking pins provided with the guide means 15, 16 still protrude beyond the periphery of the shaft 11, and are located midway between the periphery of the shaft and the circular array of detents 14. Thus the locking pins, when in the locking position, still engage the tube in a region on the side of the axis of the tube that is remote from the end of the locking pin engaging the stop means.

As shown in FIG. 3 the shaft 11 is a tubular metal element provided with a moulded covering 26 of the plastics material that covers the exterior surface of the shaft and also fills up the space within the tubular shaft. Thus the envelope surface of the shaft has the desired circular cross section. A thin layer 27 of the plastics material may be provided between the two locking pins 15, 16 facilitating movement of the locking pins. The plastics material is also located between the locking pins and the tubular metal element.

The described retractor reel can be made "belt sensitive" if the control disk 19 is constituted as an inertia member or is supplementary by an inertia member. An inertia member is a body having a comparatively large mass which is rotatably mounted on the shaft 11 and is connected to the shaft by an appropriate spring so that when the safety belt is extracted rapidly from the retractor reel the shaft 11 will rotate relative to the control disk and/or inertia member. If the belt is extracted slowly, however, the shaft and inertia member will move together.

The above described locking device operates as follows. When a person wishes to utilize a safety belt connected to the retractor reel the person can withdraw the safety belt from the reel by pulling gently on the safety belt. Provided that the safety belt is withdrawn from the reel at a relatively slow rate the locking disk 19 will move in synchronism with the shaft 11, and the locking pins 12, 13 will remain in the initial retracted position.

Should the vehicle in which the safety belt is fitted be involved in an accident it is most likely that the vehicle will decelerate rapidly, or will be thrown sideways. In either event the titltable member 22 will tilt, thus causing the lever 21 to move to a position in which one end of the lever engages a tooth 20 provided at the periphery of the locking disk 19. The disk 19 is thus prevented from rotating in a direction corresponding to withdrawal of the safety belt. If the person wearing the seat belt moves forwardly, thus tending to withdraw the seat belt from the retractor reel, the shaft 11 will begin to rotate. As the shaft 11 begins to rotate the locking pins 12, 13 will also rotate, since they extend diametrically across the shaft and the guide pins 15, 16 will move along the guide slots 17, 18 as a consequence of the design of the slots, since the disk 19 is stationary. The locking pins are then moved to a locking or projecting position and the ends of the locking pins 12, 13 will engage the stop means 14, thus preventing further rotation of the shaft 11.

If the control disk 19 is in the form of, or is supplemented by, an inertia member, if there is a sudden withdrawal of the belt, even if the tiltable member 22 has not tilted, the retractor reel will still enter a locked condition. The reason for this is that, if the belt is withdrawn rapidly the shaft 11 will rotate relatively rapidly, but the inertia member will not rotate as rapidly as the shaft 11. There will thus be a relative movement between the shaft 11 and the control disk 19 and again the arrangement of the guide slots 17, 18 is such that, under such circumstances the locking pins 12, 13 are moved to the locking position.

It will be appreciated, therefore, that the described preferred embodiment of the invention is both "belt sensitive" and "vehicle sensitive" and the device will operate to prevent the safety belt being withdrawn from the retractor reel under accident conditions.

Under very heavy braking of the vehicle, for example under collision conditions, a very large force may be applied to the shaft, and that force will be transferred to the locking pins. Under such circumstances it is conceivable that the layer of plastics material between the locking pins may be deformed. Also the layer of plastics material between the locking pins and the metal portion of the shaft may become deformed so that the locking pins will directly abut the metal tube that forms the core of the shaft. In this case the locking pins will cooperate with each other and with the tube to accommodate the force that must be transferred to the stop means. Since the locking pins will cooperate with each other under such circumstances it is possible for the locking pins each to have a relatively small cross sectional area. Thus the locking pins may be made relatively thin and have only a low weight which facilitates a reliable operation of the locking pins.

Whilst only one embodiment of a locking device in accordance with the invention has been shown in the drawings and described, it will be appreciated that many modifications may be effected within the scope of the invention. Thus, whilst the locking pins have been illustrated as having a square or rectangular cross section, the locking pins may be made of circular cross section. Whilst the shaft and the locking pins have been described as being made of metal, they may be made of any other material having sufficient strength. Whilst the connection between the control disk and the locking pins has been described as being constituted by guide pins and guide slots it is to be appreciated that any appropriate protrusion or abutment engage correspondingly appropriate guiding surface provided on the control disk may be utilized. Furthermore, the locking pins can be positioned in a single plane that is perpendicular to the axis of the shaft, or can be located adjacent each other in parallel planes. One, two or more locking pins can be used. It is not essential that the shaft is surrounded by a covering of plastics material, but it is preferable that at least the locking pin or locking pins are mounted in a layer of plastics material or some other material having a low coefficient of friction, so that the pins can be moved easily. The shaft need not necessarily be of tubular construction. However, this is an advantage because a shaft of tubular construction will have a lower weight than a solid shaft. Whilst one particular type of stop means has been illustrated, various items can constitute the necessary means.

The features disclosed in the foregoing description, in the following claims and/or in the accompanying drawings may, both separately and in any combination thereof, be material for realizing the invention in diverse forms thereof.

What is claimed is:

1. A retractor reel for a vehicle safety belt comprising a shaft rotatably mounted on a support adapted automatically to wind in a safety belt when the belt is not in use and incorporating means for locking the shaft to prevent the belt being withdrawn from the retractor reel under certain conditions, said locking means comprising stop abutment means on said support and at least one elongate locking pin which has a longitudinal dimension and which extends through an aperture in the shaft, with the longitudinal dimension of said pin extending substantially diametrically across the shaft and substantially perpendicularly to the longitudinal axis of the shaft, the locking pin being movable in the direction of its longitudinal dimension between a retracted position and an extended locking position, the locking pin, when in the locking position, having an engagement end extending out of the shaft on one side thereof to cooperate with said stop abutment means provided on the support to prevent rotation of the shaft, the opposite end of the locking pin protruding beyond the periphery of the shaft and engaging the shaft on the side of the shaft that is remote from the engagement end of the locking pin, there being a control disk rotatably mounted on the shaft for controlling movement of the locking pin.

2. A retractor reel according to claim 1 wherein two substantially parallel locking pins are provided, both displaceably mounted in the shaft extending perpendicularly to the axis of the shaft, the pins being displaceable in opposite directions.

3. A retractor reel according to claim 2, wherein the two locking pins are located in a common plane that is perpendicular to the axis of the shaft.

4. A retractor reel according to claim 3, wherein the locking pins are arranged such that the locking pins substantially abut each other when in their locking positions.

5. A retractor reel according to claim 1, wherein said stop abutment means consists of a ring of protruding stop elements, concentric with the shaft, the arrangement being such that when each locking pin is in the locking position, the end of the locking pin remote from the engagement end is substantially midway between the surface of the shaft and the said ring of stop elements.

6. A retractor reel according to claim 1, wherein the shaft is tubular and is moulded into a covering of appropriate material, each locking pin passing through an aperture formed in the tube, there being covering material between each locking pin and the tube.

7. A retractor reel according to claim 6, wherein the said covering is formed of a plastics material, and surrounds the tube and completely fills the tube.

8. A retractor reel according to claim 7, wherein there are two locking pins with intermediate layer of plastics material located between them.

* * * * *